UNITED STATES PATENT OFFICE.

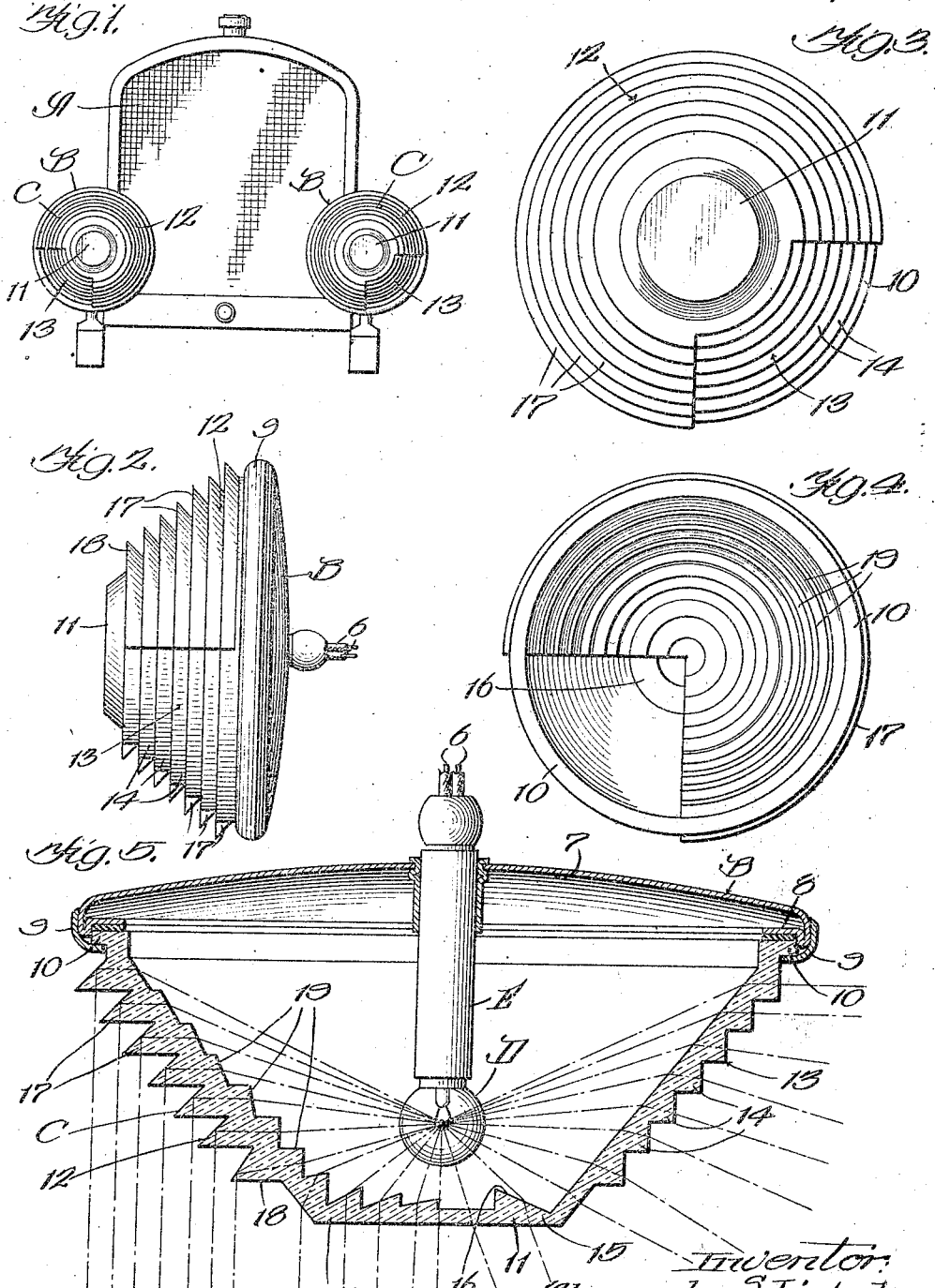

ALEXANDER S. LIMPERT, OF PITTSBURGH, PENNSYLVANIA.

HEADLIGHT.

1,399,973.    Specification of Letters Patent.    Patented Dec. 13, 1921.

Application filed November 8, 1919. Serial No. 336,532.

*To all whom it may concern:*

Be it known that I, ALEXANDER S. LIMPERT, a citizen of the United States, residing in Pittsburgh, in the county of Allegheny and State of Pennsylvania, have invented certain new and useful Improvements in Headlights, of which the following is a description, reference being had to the accompanying drawing, forming a part of this specification.

My present invention relates in general to an improved headlight, and has reference more particularly to a novel construction of headlight lens adapted primarily for use in connection with automotive vehicles, one object being to provide an automobile headlight capable of projecting forwardly a strong beam of light in all substantial respects parallel with the ground line, and a beam which does not rise above a predetermined height, approximating forty-two inches, from the ground, and thereby avoid glare within the vision of approaching pedestrians or the occupants of other vehicles. Another object of the invention resides in the provision of means in a headlight of this sort adapted, in addition to the forwardly directed beam, to illuminate the ground immediately to the front and side of the vehicle.

In headlights now being marketed, certain light rays emanating from the light source are reflected by means of a parabolic reflector. Lenses have been designed for these headlights for the announced purpose of rendering the parabolic rays endurable by deflecting them downwardly. My invention therefore contemplates furthermore the provision of a headlight casing whose inner surface is inert or functionless so far as parabolic reflection is concerned, together with a headlight lens projecting forwardly from the marginal rim of the casing and a light source positioned within the lens, the lens being provided with prismatic means located with reference to the rays directly emitted from the source as to attain the objects mentioned in the first paragraph of this specification.

Differently stated, I aim to produce a headlight having its light source within the lens itself and no reflector, and a lens which may be easily and cheaply constructed to properly deflect the direct rays into a beam projected within the permissible range and distributed in the desired directions. Obviously as no parabolic reflector is employed, this stated arrangement serves to materially reduce initial cost and upkeep, particularly as the lens may be fabricated at a cost no greater than lenses now in use, while at the same time the efficiency of the headlight is increased.

These, together with such other objects and advantages, as may presently appear, or are incident to my invention, I attain by means of a construction illustrated in preferred form in the accompanying drawings, wherein:

Figure 1 is a front elevation of a part of an automobile front end provided with headlights embodying my invention;

Fig. 2 represents a side elevation, on an enlarged scale, of the headlight to the right of Fig. 1;

Fig. 3 is a view in front elevation of the lens of Fig. 2;

Fig. 4 is a rear elevation of the same; and

Fig. 5 represents a horizontal sectional view, on a further enlarged scale, taken through the headlight illustrated in Fig. 2.

In the drawings, the automobile front end or hood A is shown provided with a pair of headlights each of which is identical in construction and comprising, broadly, a frame or casing B, and a light refracting lens C having within it an incandescent lamp D carried by a supporting member E mounted centrally in the casing, and through which member the wires 6 for the lamp extend.

It should be observed that I do not employ the customary headlight reflector, parabolic or otherwise, in the casing B, the inner surface 7 of the latter being inert or devoid of function in so far as any reflection of the rays emitted by the lamp D is concerned. The casing therefore simply acts as the rear closure member of the headlight and as a positioning medium for the lamp and the lens. In order to position the lens the casing may be provided with inner and outer marginal annuli 8 and 9 coöperating in any suitable manner to grip the rim 10 of the lens.

In the present instance, the lens is shaped to present a contour approximating that of a truncated cone, the truncation of which takes the form of a central disk portion 11 having, of course, a diameter considerably less than that of the basal rim 10. It is also divided into two distinct parts or sectors 12 or 13, the former embracing substantially three-fourths of the lens surface, the latter covering the segmental remainder thereof and whose sloping arcuate wall is formed with 90 degrees prismatic ridges 14 arranged with reference to the lamp filament so as to refract direct rays emitted therefrom in lateral and downward directions, as is indicated in a general way by the dotted lines to the right of Fig. 5. A portion 15 of the disk 11, within the apex of the segment may be similarly provided with a ridge 16 having approximately a twenty degree angle with respect to the vertical face of the disk.

On the other hand, the three-quarter sector 12 is provided exteriorly on its sloping arcuate wall with concentric forty-five degree prismatic ridges 17 and a forward ridge 18 approximating 51 degrees. These ridges describe substantially three-quarters of a circle. In order to bend the rays emanating from the source in a forward parallel relation, the inner face of this sector is formed with ridges 19 constructed and arranged to extend in a succession as far rearwardly of the source as may be desired to catch the rays and bend them in the required angular directions. Part of these ridges coöperate with the outer ridges 17 and 18, and the other part with that portion 15' of the disk within the area of this particular sector, whereby the light rays thus caught are refracted in the manner indicated by the dotted lines at the left of Fig. 5 so as to forwardly project a strong beam of light to all practical intents and purposes parallel with the ground line.

It should be observed that the center of the lamp is in close proximity to the disk, enabling practically all of the emitted light to be directed along and on the road line, both in advance and at the sides of the vehicle front end, and this with only an absorption loss in the glass of the lens. On the other hand where parabolic reflectors are used the reflector loss is very high, which loss is of course increased as these parabolic reflectors tarnish and otherwise deteriorate. Obviously in applying a pair of these lenses one is given a quarter turn more than the other to bring them into their correct relation, as shown in Fig. 1, with reference to lateral illumination in front of the vehicle wheels. It will be apparent also that my headlight may be readily and easily applied as a unit to old headlights or the lens only may be attached after first removing the parabolic reflectors and advancing the lamp. The device is simple, efficient and economical, and absolutely eliminates glare coming within the ban of the strictest State law. Other advantages will be apparent to those skilled in the art.

I claim:—

1. A headlight lens having an annular marginal rim and a central disk disposed in advance of said rim and provided with a light refracting side wall portion concentric with said rim and converging toward said disk, the greater part of said portion formed with variably-angled refracting ridges constructed and arranged whereby to refract light rays emanating from a point behind the disk in a forward direction and the lesser part provided with substantially equi-angled refracting ridges designed to refract other light rays from the same point in a lateral and downward direction.

2. A headlight lens having an annular marginal rim and a central disk disposed in advance of said rim and provided with a light refracting side wall portion concentric with said rim and converging toward said disk, the greater part of said portion formed with variably-angled refracting ridges constructed and arranged whereby to refract light rays emanating from a point behind the disk in a forward direction and the lesser part provided with substantially equi-angled refracting ridges designed to refract other light rays from the same point in a lateral and downward direction, all of said ridges being concentric.

3. A headlight lens comprising an annular attaching portion and a main light-refracting body portion converging forwardly of said annular portion in a direction toward the focal axis of the lens, in combination with a light source positioned within said body portion in line with the focal axis and in advance of said annular attaching portion, said body portion provided with vari-angled concentric prismatic ridges and reflecting prisms, for refracting rays of light emanating from said source in a forward direction, and with equi-angled refracting ridges refracting rays of light in a direction inclined to the focal axis.

4. A headlight lens comprising an annular attaching portion and a main light-refracting body portion converging forwardly of said annular portion in a direction toward the focal axis of the lens, in combination with a light source positioned within said body portion in line with the focal axis and in advance of said annular attaching portion, said body portion provided with vari-angled concentric prismatic ridges and reflecting prisms, for refracting rays of light emanating from said source in a forward direction, and with equi-angled refracting ridges refracting rays of light in a direction inclined to the focal axis, said ridges disposed in a related succession about said source.

5. In a headlight, the combination of a support, a headlight lens shaped to approximate in contour a truncated cone and having a basal rim marginally engaging said support, and a light source carried by said support in advance of the rim and directly behind the truncation of the lens, the latter provided with a related series of inner and outer arcuate refracting ridges extending over more than one-half of the lens face and constructed for refracting light rays from the source in a forward direction and in substantial parallelism, and formed with an independent series of arcuate refracting ridges extending over less than one-half of the lens face for laterally refracting other light rays from said source.

ALEXANDER S. LIMPERT.

Witness:
   Geo. C. Blair.